(12) United States Patent
Li

(10) Patent No.: US 7,409,460 B1
(45) Date of Patent: Aug. 5, 2008

(54) METHOD AND APPARATUS FOR MANAGING NETWORK TRAFFIC

(75) Inventor: Ning Xiang Li, Sequim, WA (US)

(73) Assignee: F5 Networks, Inc., Seattle, WA (US)

( * ) Notice: Subject to any disclaimer, the term of this patent is extended or adjusted under 35 U.S.C. 154(b) by 892 days.

(21) Appl. No.: 10/438,229

(22) Filed: May 12, 2003

(51) Int. Cl.
    *G06F 15/173* (2006.01)
(52) U.S. Cl. .................................. 709/240; 709/238
(58) Field of Classification Search ............... 709/283, 709/240
    See application file for complete search history.

(56) References Cited

U.S. PATENT DOCUMENTS

| | | | |
|---|---|---|---|
| 5,838,922 A * | 11/1998 | Galand et al. ............... | 709/232 |
| 5,970,048 A | 10/1999 | Pajuvirta et al. | |
| 6,125,397 A | 9/2000 | Yoshimura et al. | |
| 6,373,937 B1 * | 4/2002 | Yegoshin ............... | 379/266.01 |
| 6,388,687 B1 * | 5/2002 | Brackett et al. ............. | 715/810 |
| 6,480,500 B1 * | 11/2002 | Erimli et al. ................ | 370/412 |
| 7,095,750 B2 * | 8/2006 | Craddock et al. ........... | 370/412 |

OTHER PUBLICATIONS

Jim Duffy, "Switching shindig," May 8, 2000.
Stephen Jacobs, et al., "Streaming Video using Dynamic Rate Shaping and TCP Congestion Control," pp. 1-29, Jan. 21, 1998.
Cisco Systems, "Cisco ONS 15454 Ethemet Rate-Shaping Application Note," pp. 1-3, 2000.
Scott Martin, "WAN Rate Shaping with NATing Loopback Interfaces," May 12, 2001.
Farlex, The Free Dictionary, "Traffic Engineering Methods," 2005.
Doug Allen, "Layer-7 Load Balancers Pack New Punch," Sep. 4, 2003.
F5, "BIG-IP® Reference Guide," version 4.5, i-16-6, 2002.
F5, "BIG-IP® Link Controller Solutions Guide," version 4.5, i-Index-2, 2002.
Cisco IOS Quality of Service Solutions Configuration Guide "Policing and Shaping Overview" QC-203 through QC-218 (16 pages in total), dated May 2003.
Department of Electrical Engineering and Columbia New Media Technology Center, Columbia University, New York; Stephen Jacobs and Alexandros Eleftheriadis; "Streaming Video using Dynamic Rate Shaping and TCP Congestion Control" dated Jan. 21, 1998; pp. 1-29.
North America Radware, Inc., www.radware.com; "Bandwidth Management in Radware's SynApps Architecture" (17 pages in total), dated Sep. 30, 2000.
Internet RFC/STD/FYI/BCP Archives; RFC2963; Network Working Group; O. Bonaventure, FUNDP, S. De Cnodder, Alcatel; "A Rate Adaptive Shaper for Differentiated Services"; dated Oct. 2000 (14 pages in total).

(Continued)

*Primary Examiner*—Ario Etienne
*Assistant Examiner*—Avi Gold
(74) *Attorney, Agent, or Firm*—Darby & Darby P.C.; John W. Branch

(57) ABSTRACT

A system, apparatus, and method for managing the flow of data on a network. A plurality of processors are used to implement a virtual queue, for controlling a rate of flow of data on the network. Each of the processors has a member queue, the combination of member queues combining to form the virtual queue. Aspects of the invention use messages to communicate among the processors, to properly control the rate of flow.

12 Claims, 13 Drawing Sheets

OTHER PUBLICATIONS

Network & Systems Management/Bandwidth Regulators; "Bandwidth Regulators" by Lori Mac Vittie; dated May 28, 2001 (4 pages in total).

searchnetworking.techtarget.com/tip; Networking Tips & Newsletters; "Traffic policing and shaping"; by Tom Lancaster; dated May 30, 2002 (3 pages in total).

* cited by examiner

METHOD AND APPARATUS FOR MANAGING NETWORK TRAFFIC

FIELD OF THE INVENTION

This application relates generally to managing traffic across a computer network, and, more specifically, to techniques for managing the flow of data on a network.

BACKGROUND

A traffic manager is a network device that manages network traffic. Some traffic managers manage the flow of network traffic between network devices. Some traffic managers control the flow of data packets to and from an array of application servers. A traffic manager can manage and distributes Internet, intranet or other user requests across redundant arrays of network servers, regardless of the platform type. Traffic managers can support a wide variety of network applications such as web browsing, e-mail, telephony, streaming multimedia and other network protocol traffic. The BIG-IP® family of traffic managers, by F5 Networks of Seattle, Wash., are examples of traffic managers.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise.

The phrase "in one embodiment" as used herein does not necessarily refer to the same embodiment, though it may.

As used herein, the term "or" is an inclusive "or" operator, and is equivalent to the term "and/or", unless the context clearly dictates otherwise.

The term "packet" refers to an arbitrary or selectable amount of data that may be represented by a sequence of one or more bits, and is transferred between devices across a network.

Generally, the phrase "computer-readable media" includes any media that can be accessed by a computing device. Computer-readable media may include computer storage media, communication media, or any combination thereof.

The phrase "communication media" typically embodies computer-readable instructions, data structures, program modules, or other data in a modulated data signal such as a carrier wave or other transport mechanism and includes any information delivery media. By way of example, communication media includes wired media such as twisted pair, coaxial cable, fiber optics, wave guides, and other wired media and wireless media such as acoustic, RF, infrared, and other wireless media.

The term "modulated data signal" means a signal that has one or more of its characteristics set or changed in such a manner as to encode information in the signal.

The term "based on" is not exclusive and allows for being based on additional factors not described, unless the context clearly dictates otherwise.

Figure 1:
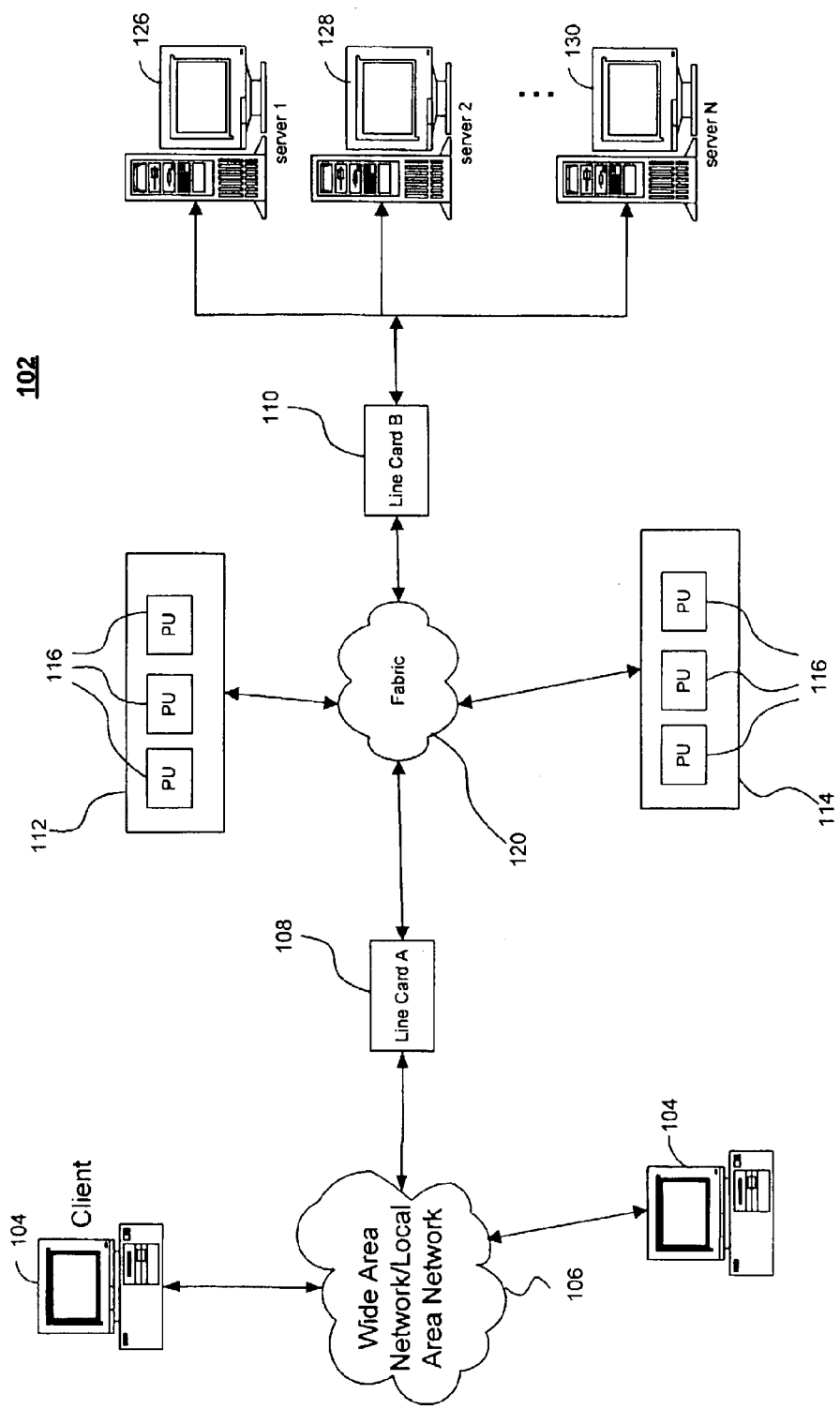
FIG. 1 is a system diagram of a computer network in which the invention may be practiced.

FIG. 1 illustrates an exemplary environment 102 in which one embodiment of the invention operates. The environment 102 includes a network 106. The network 106 can be a wide area network (WAN), a local area network (LAN), or a combination of interconnected WANs and LANs. The Internet is made up of a vast number of such interconnected networks, computers, and network devices that use the Transmission Control Protocol/Internet Protocol ("TCP/IP") suite of protocols to communicate with one another. The environment further includes one or more client devices 104 (also referred to as clients), one or more processing cards 112-114, one or more line cards 108-110, and a server array. A switch fabric 120 connects the line cards and the processing cards 112-114. Each of the processing cards 112-114 includes one or more processing units (PU) 116. The server array includes servers 126-130. Network 106 couples clients 104 to the line card 108. Line card 110 couples the server array to network 106. Line cards provide a network interface for a processor or a network device. An example of a line card is the DS3 Line Card, by Cisco Systems, of San Jose, Calif. Line card 108 includes a distributor (not shown) that distributes packets arriving from the clients 104 among the processing units 116. The line card 108 also receives packets from the processing units 116 and forwards them to the network 106.

Clients 104 are computing devices capable of connecting with network 106. The set of such devices can include devices that connect using one or more wired communications mediums, a wireless communications medium, or a combination of wired and wireless communications mediums. Clients 104 include such devices as personal computers, multiprocessor systems, microprocessor-based or programmable consumer electronics, network PCs, cell phones, smart phones, pagers, PDAs, Pocket PCs, wearable computers, walkie talkies, radio frequency (RF) devices, infrared (IR) devices, CBs, integrated devices combining one or more of the preceding devices, and the like.

Servers 126-130 are computing devices that provide information and/or services to clients 104. Servers 126-130 can, for example, store web pages or components thereof, dynamically create web pages or components thereof, store data and/or files for access by other servers or clients, provide services to clients or other network devices, or any combination of these functions.

In one embodiment, clients 104 are sites where a human user operates the computing device to make requests for data or services from other computers on the network. Often, the requested data resides in computing devices such as servers 126-130. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, clients 104 are computing devices that are not operated by a human user.

In one embodiment, each PU 116 includes logic that manages traffic between the server array and the clients 104. This logic can include load balancing logic, packet inspection logic, and server persistence logic. A PU 116 that manages traffic is sometimes called a traffic manager. The BIG-IP® family of traffic managers, by F5 Networks, of Seattle, Wash. is one example of a traffic manager. Various functions of the BIG-IP Traffic Manager are disclosed in the BIG-IP Reference Guide, version 4.5.

Figure 2:
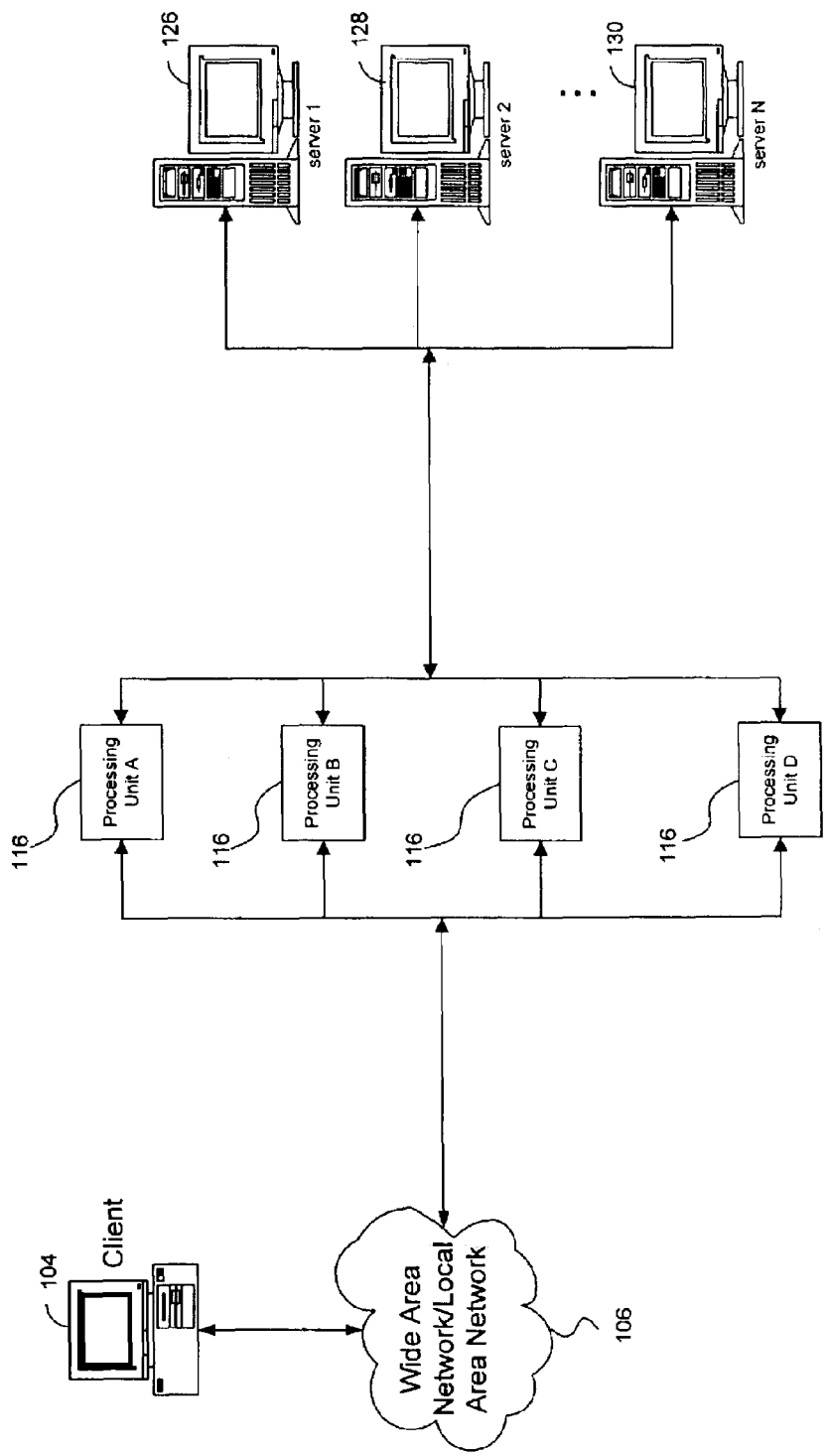
FIG. 2 is a system diagram of a computer network in which the invention may be practiced.

FIG. 2 illustrates a flow of data packets across the network of FIG. 1. For clarity, some of the components of FIG. 1 are omitted from FIG. 2. As illustrated by FIG. 2, a data packet can flow from a client 104 over the network 106 to one of the processing units 116. The data packet is forwarded to a server 126-128 of the server array. The processing unit 116 might alter packets prior to forwarding them. The processing unit might also drop some packets, combine packets, split packets, or create new packets prior to forwarding them. In one embodiment, each processing unit 116 establishes a connection with a client 104, such as a TCP connection, across which packets are transmitted. The processing unit also establishes a separate TCP connection with one or more of the servers 126-130. The processing unit receives data from the client 104, creates new packets, and transmits some or all of the data to the server in the new packets. As used herein, the phrase forwarding packets includes embodiments such as these, where data is forwarded, even when the data is forwarded in modified, combined, split, or new packets.

As also illustrated in FIG. 2, data packets can flow from one of the servers 126-130 to one of the processing units 116. The processing unit transmits some or all of the data packets to the client 104 over the network 106. Packets received by a processing unit are called ingress packets, while packets transmitted by a processing unit are called egress packets. In one implementation, the invention is practiced with egress packets. The invention can also be practiced with ingress packets.

Figure 3:
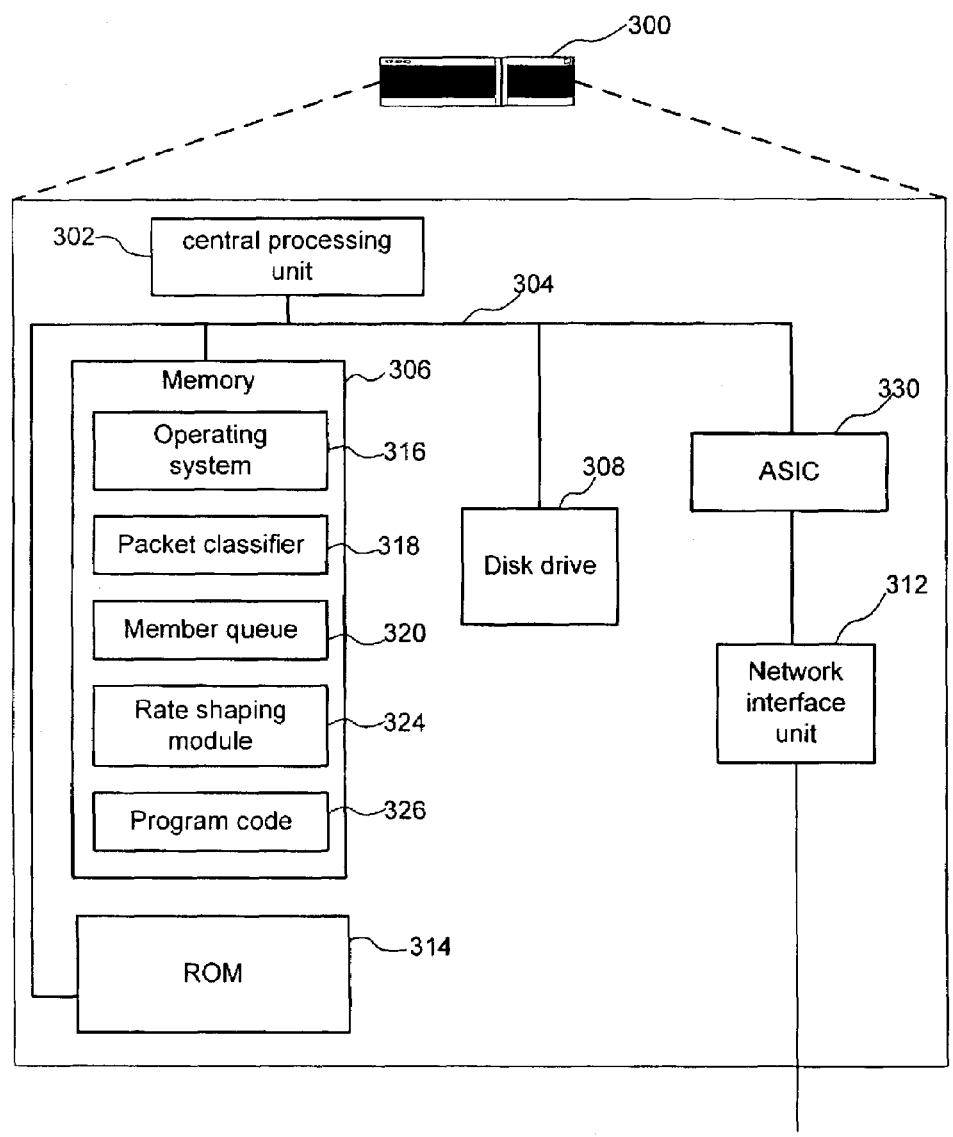
FIG. 3 is a block diagram of an exemplary network device that may be employed to perform the invention.

FIG. 3 shows an exemplary processing unit 300 that can operate in accordance with an embodiment of the present invention. It will be appreciated that not all components of processing unit 300 are illustrated, and that processing unit 300 can include more or fewer components than those shown in FIG. 3. Processing unit 300 can operate, for example, as a router, bridge, firewall, gateway, distributor, load balancer, traffic manager, or proxy server. It is to be noted that these functions are not necessarily distinct from each other. For example, a traffic manager may perform load balancing and control an array of servers. The communications can take place over network 106 (FIG. 1), or some other communications network known to those skilled in the art.

As illustrated in FIG. 3, processing unit 300 includes a central processing unit (CPU) 302, mass memory, and a network interface unit 312 connected via a bus 304. Network interface unit 312 includes the necessary circuitry for connecting processing unit 300 to network 106, and is constructed for use with various communication protocols, including the TCP/IP protocol. Network interface unit 312 can include or interface with circuitry and components for transmitting messages and data over a wired and/or wireless communications medium.

The mass memory generally includes random access memory ("RAM") 306, read-only memory ("ROM") 314, and one or more permanent mass storage devices, such as hard disk drive 308. The mass memory stores operating system 316 for controlling the operation of processing unit 300. The operating system 316 may comprise an operating system such as UNIX®, LINUX®, or Windows®.

In one embodiment, the mass memory stores program code and data for implementing a load balancer, and program code and data for implementing a persistence engine. The mass memory can also store additional program code 326 and data for performing the functions of processing unit 300. The mass memory can further include one or more user programs for controlling the processing unit 300.

As illustrated in FIG. 3, the processing unit 300 includes a packet classifier module 318, one or more member queue modules 320, and a rate shaping module 324. The member queue module 320 includes data and access code or logic pertaining to a single queue. The access routines include, for example, code to add an item to a queue, to retrieve the next item in the queue, and to delete an item from the queue. The functions of the rate shaping module are explained below.

In one embodiment, the processing unit 300 includes one or more Application Specific Integrated Circuit (ASIC) chips 330 connected to the bus 304. The ASIC chip 330 includes logic that performs some of the functions of processing unit 300. For example, in one embodiment, the ASIC chip 330 performs a number of packet processing functions, to process incoming packets. In one embodiment, the ASIC chip 330 includes at least a portion of the packet classifier 318, the member queue module 320, or the rate shaping module 324. In one embodiment, the processing unit 300 includes one or more field-programmable gate arrays (FPGA) (not shown), instead of, or in addition to, the ASIC chip 330. A number of functions of the processing unit can be performed by the ASIC chip 330, by an FPGA, by the CPU 302 with the logic of program code stored in mass memory, or by any combination of the ASIC chip, the FPGA, and the CPU.

In one embodiment, the processing unit 300 includes or communicates with an SSL proxy (not shown) that performs cryptographic operations.

Computer storage media can include volatile and nonvolatile, removable and non-removable media implemented in any method or technology for storage of information, such as computer readable instructions, data structures, program modules or other data. Examples of computer storage media include RAM 306, ROM 314, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Processing unit 300 can be implemented as one or more "blades" where the term "blade" refers to one of multiple electronic circuit boards or cards that are installed in a hardware chassis with a backplane. An exemplary blade can include one or more processors, volatile and non-volatile memory, interfaces suitable for communicating information to and from the blade, and other components for enabling the operation of one or more applications. A blade can also include a specialized interface for the backplane and other interfaces, such as a USB port, FIREWIRE port, serial port, RF interface, IR interface, Ethernet interface, IDE controller, and the like. An application running on a blade can employ any of these interfaces to communicate information to other applications running on other blades and/or devices coupled to the blade server. Processing unit 300 can also be implemented as a combination of blades and additional components in chassis. In one embodiment, servers 126-130, of FIG. 1, are implemented as blades. In one embodiment, processing card 112 (FIG. 1) is implemented as a blade, and includes or communicates with one or more processing units.

In one exemplary implementation of the invention, the processing unit is a load-balancing traffic manager. In this example, the traffic manager includes load-balancing and control logic that can be implemented in software, hardware, or a combination of software and hardware.

In one embodiment, the processing unit is a traffic manager that intelligently distributes web site connections across the server array. The traffic manager can manage connections to one or multiple Internet or intranet sites, and it can support a wide variety of Internet protocols and services such as TCP/IP (transmission control protocol/Internet protocol) and HTTP. Additionally, the traffic manager can support any one or more of a suite of communications protocols that are used to connect nodes on the Internet, including HTTP, file transfer (FTP), secure sockets layer (SSL), streaming media, DNS, UDP/IP, and email (SMTP).

In one embodiment, a network device (not shown) includes one or more processing units 300. The processing units can be integrated on a processing card 112 (FIG. 1), or on separate cards.

Figure 4:
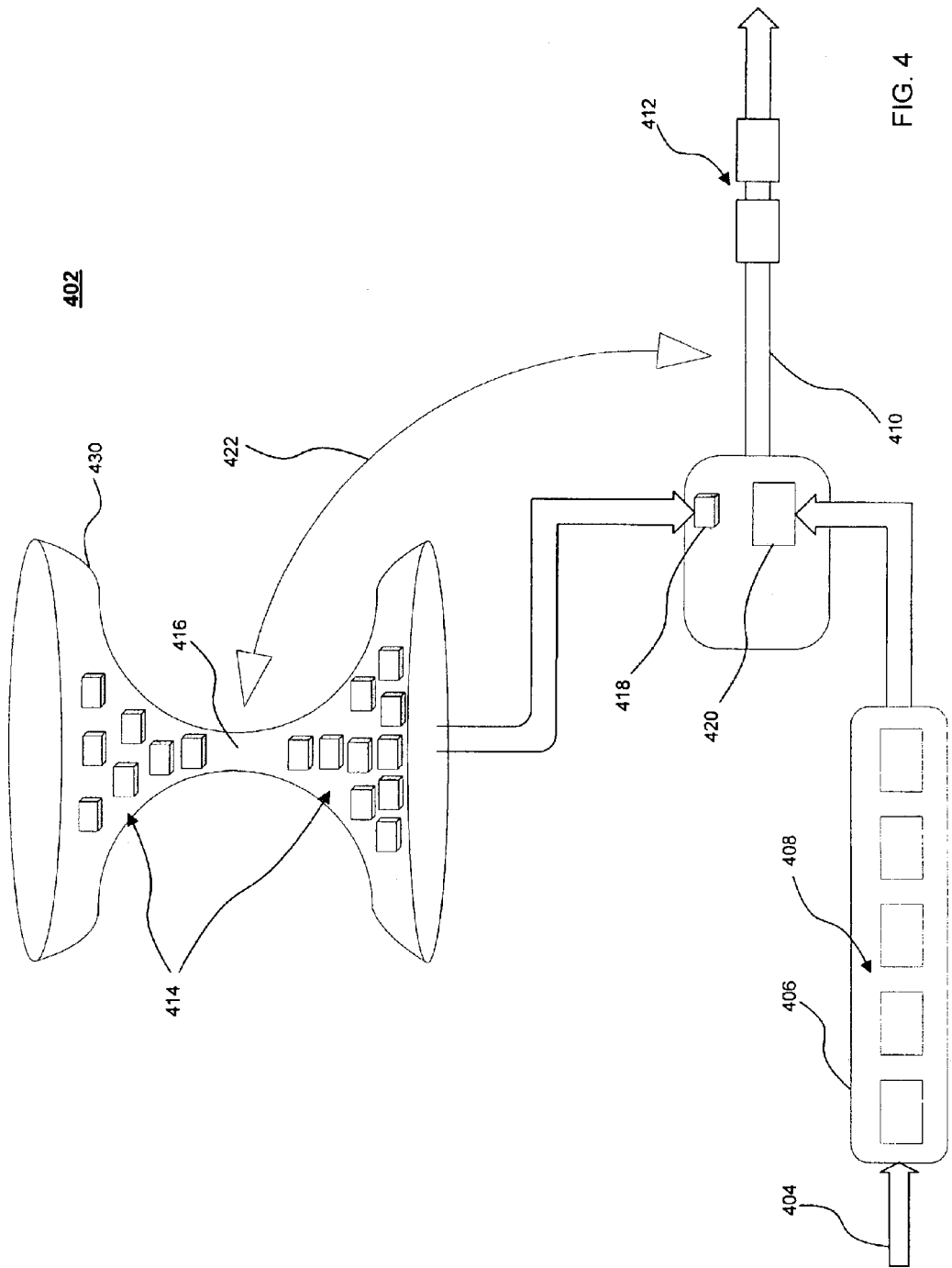
FIG. 4 illustrates a logical conception of rate shaping in accordance with an embodiment of the present invention.

FIG. 4 illustrates a logical conception of rate shaping in accordance with an embodiment of the present invention. As illustrated in FIG. 4, arrow 404 represents a flow of incoming data packets. The incoming data packets are classified into a data class and placed into a packet queue 406. In one embodiment, there is one packet queue for each data class. In one embodiment, each class has one or more corresponding packet queues. In one embodiment, more than one class can use the same packet queue. In one embodiment, there is only one packet class. For clarity, only one packet queue 406 is shown in FIG. 4.

Packets can be classified based on one or more of a number of criteria. For example, packets can be classified according to their destination, such as IP address and/or port number, or whether they are going to a target server 126-128 (FIG. 1), to a client 104, or other device. Packets can also be classified according to whether it is egress or ingress, which link is used for egress, including the VLAN or MAC address, or the type of traffic. Type of traffic could include the protocol, target port number, or application). Packets can also be classified according to traffic content, such as layer 6-7 content, referring to the Open Systems Interconnect (OSI) model. Each classification corresponds to a packet queue of FIG. 4, and a virtual packet queue of FIG. 5.

In FIG. 4, the packet queue 406 is shown containing data packets 408. In one embodiment of the invention, the queue is maintained by employing a first in first out (FIFO) algorithm, where conceptually, new packets are placed at the back end of the queue and packets are removed from the queue at the front end. Other queue processing algorithms can also be employed with the present invention. Other queue processing algorithms might vary with respect to where packets are inserted into the queue, and where packets might be removed from the queue.

Arrow 410 represents a flow of outgoing data packets 412, after processing in accordance with the invention. One aspect of the invention controls the rate at which the outgoing data packets flow, called the outgoing packet flow rate. Outgoing packets can be directed toward a client, such as client 104 (FIG. 1) or toward a server, such as servers 126-130.

Tokens 414 are shown within an hourglass 430. The hourglass is a conceptual container for the tokens 414, to illustrate that tokens are available at a controlled rate. The rate at which the tokens 414 pass through the neck 416 of the hourglass indicates a rate at which tokens are available. In accordance with one aspect of the invention, the rate at which tokens are available represents a desired mean outgoing packet flow rate. A double arrow 422 connecting the neck 416 of the hourglass and the outgoing data packet flow arrow 410 indicates that a matching of the outgoing data packet flow rate and the token availability rate is a desired outcome of the invention.

In FIG. 4, a correspondence between token 418 and packet 420 illustrates that conceptually, there is a matching between tokens and packets. As discussed in further detail below, data packets can vary in size, and aspects of the invention include matching tokens with packets based on the size of packets. Additionally, as also discussed below, aspects of the invention control an amount that the actual data packet flow rate may vary from the desired data packet flow rate.

Rate shaping provides a way to allocate limited resources to network traffic. One use for rate shaping is to allow high priority traffic to proceed, at the expense of lower priority traffic. Another use of rate shaping is to save costs or to comply with service level agreements with a service provider. For example, the communications link might have a high capacity, while a service level agreement might provide for a lower volume of traffic. Rate shaping allows the user to comply with the designated traffic limit. A service provider might use rate shaping to limit traffic to one or more of its customers. There are numerous other applications of rate shaping.

Figure 5:
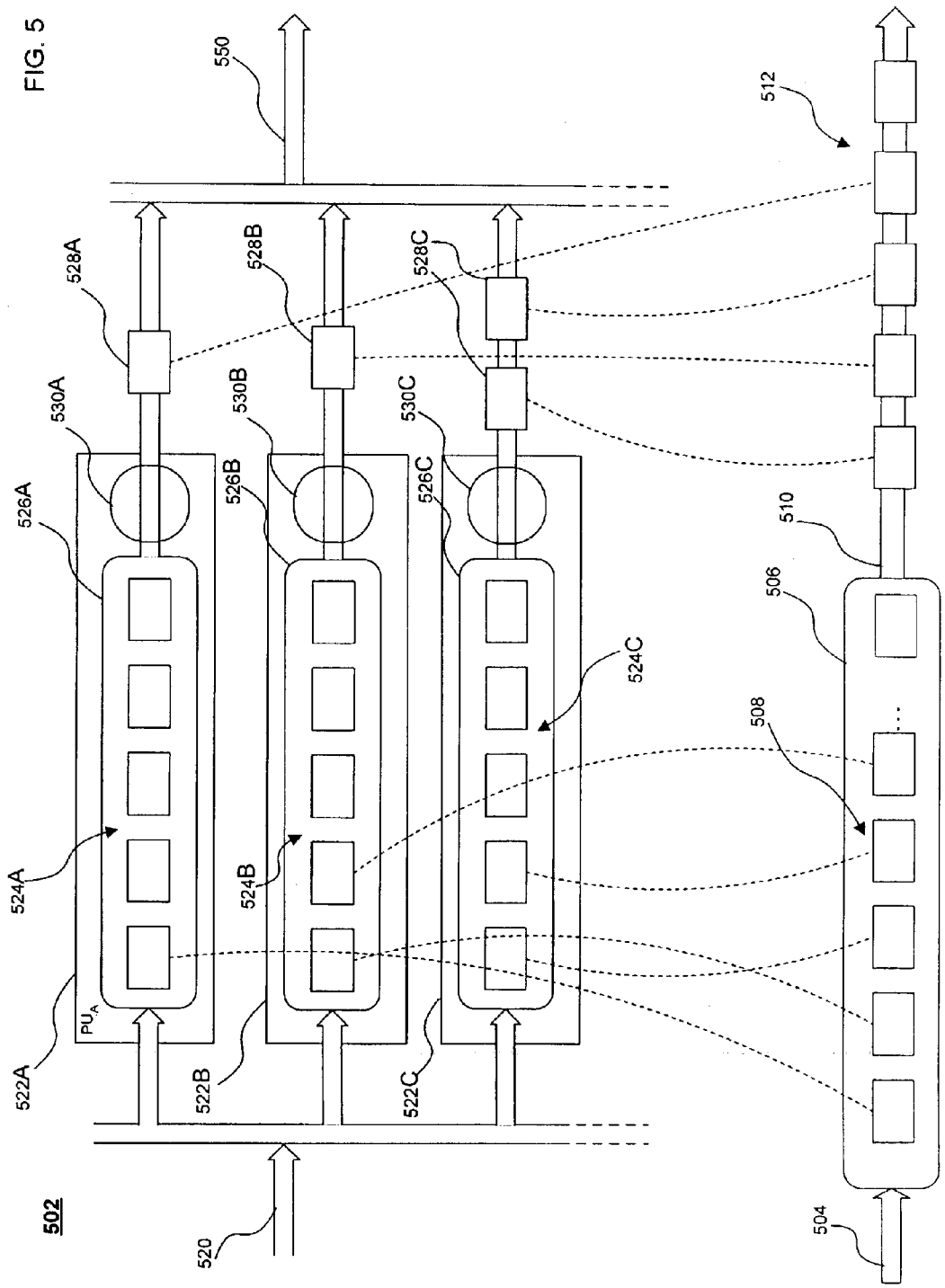
FIG. 5 illustrates a logical conception of rate shaping in accordance with an embodiment of the present invention.

FIG. 5 illustrates a logical conception of distributed rate shaping in accordance with an embodiment of the present invention. As illustrated in FIG. 5, arrow 504 represents a flow of incoming data packets, and corresponds to the incoming data packets represented by arrow 404 of FIG. 4. The incoming data packets represented by arrow 504 are classified and placed in a virtual packet queue 506, containing data packets 508. Arrow 510 represents a virtual flow of outgoing data packets 512, after processing in accordance with the invention. Virtual packet queue 506, data packets 508, arrow 510, and outgoing data packets 512 correspond to packet queue 406, data packets 408, arrow 410, and outgoing data packets 412, respectively, of FIG. 4.

In accordance with aspects of the present invention, virtual packet queue 506 corresponds to the aggregation of two or more member queues. In FIG. 5, the member queues are illustrated as member queues 526A-C, containing data packets 524A-C, respectively. The member queues 526A-C are distributed among corresponding processing units (PU)

522A-C, respectively. The member queues 526A-C corresponding to the PUs 522A-C are referred to as local member queues with respect to the corresponding PU.

As illustrated in FIG. 5, incoming data packets, represented by arrow 520, corresponding to arrow 504, are distributed among the processing units 522A-C. Each processing unit processes the incoming data packets it receives, including classification of the packets, and inserts each received data packet into a member queue corresponding to the processing unit and the packet classification. For clarity, FIG. 5 illustrates only member queues of a single packet class. In accordance with aspects of the invention, each processing unit can have one or more member queues corresponding to one or more packet classifications. As discussed with respect to FIG. 4, a variety of queuing techniques, such as FIFO, can be used for inserting and removing packets from their respective queues. The aggregation of the member queues 526A-C corresponds to the virtual packet queue 506.

The processing units 522A-C remove data packets from their respective member queues 526A-C, and process them in a way that controls the rate of outgoing packet flow. The processing is represented by blocks 530A-C, respectively. The processing is discussed in further detail below. The outgoing data packets 528A-C corresponding to each processing unit 522A-C are then forwarded to target devices, such as clients 104 or servers 126-130 of FIGS. 1 and 2. Outgoing data packets corresponding to each processing unit 522A-C can go to any of the target servers 126-130. The conceptual aggregation of all outgoing data packets 528A-C forms a virtual outgoing packet flow 550 corresponding to the virtual outgoing packet flow 510. As discussed with respect to FIG. 4, and in more detail below, one aspect of the invention controls the virtual outgoing packet flow so that the rate of virtual outgoing packet flow approximates a desired mean flow rate, and the variations in virtual outgoing packet flow are within additional desired constraints. In one embodiment, the virtual outgoing packet flow refers to packets that are sent out over the network 106 of FIG. 1.

One desired constraint of rate shaping, briefly discussed above, is the mean rate (MR). The mean rate is a mean rate of data flow over a specified amount of time that is a target of the rate shaping process. The mean rate is specific to a virtual queue, and can vary for each virtual queue. Other configuration parameters, such as burst size and excess burst size, are also specific to a virtual queue, and can vary for each virtual queue.

Burst size (BS) is the size of a burst of data in the outgoing data flow. If the mean rate is measured over a time interval of Ti, then $$MR=BS/Ti.$$

Therefore, in rate shaping, it is desired that for each time interval Ti, the average burst size is equal to MR X Ti.

Excess burst size (EBS) is the amount of data that a burst of data is allowed to exceed the burst size over a specified time interval. For any time interval Ti, the burst size should not exceed BS+EBS. If EBS equals zero, then for each time interval Ti, the burst size should not exceed MR X Ti. When EBS is greater than zero, a burst size is allowed to exceed MR X Ti, so that the mean BS equals MR X T for a period of time T that includes many time intervals Ti.

In one embodiment, BS and EBS are measured in bits, and MR is measured in bits per second.

In one embodiment of the invention, the set of processing units 116 (FIG. 1) includes one master PU, and the remaining PUs are considered to be slave PUs. The master PU is used to synchronize data kept by each PU.

Figure 6:
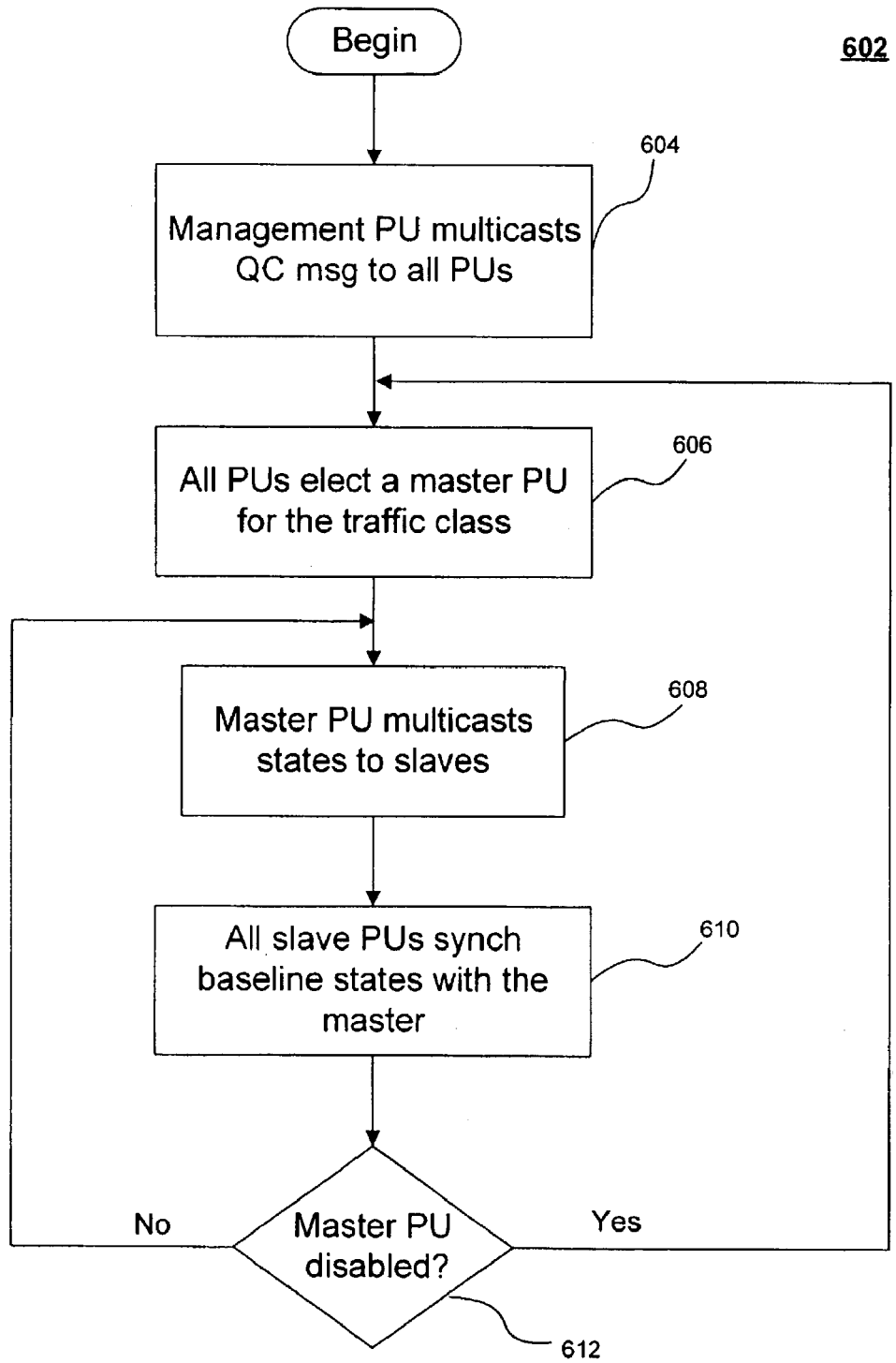
FIG. 6 is a flow chart illustrating a process of synchronization among processing units in accordance with an embodiment of the invention.

FIG. 6 illustrates a process 602 for using a master PU to synchronize data of all PUs. As illustrated in FIG. 6, after beginning, at a block 604, a predetermined management PU multicasts a queue creation (QC) message to all PUs. The QC message instructs the PUs to continue with the next action of the process 602.

Figure 7:
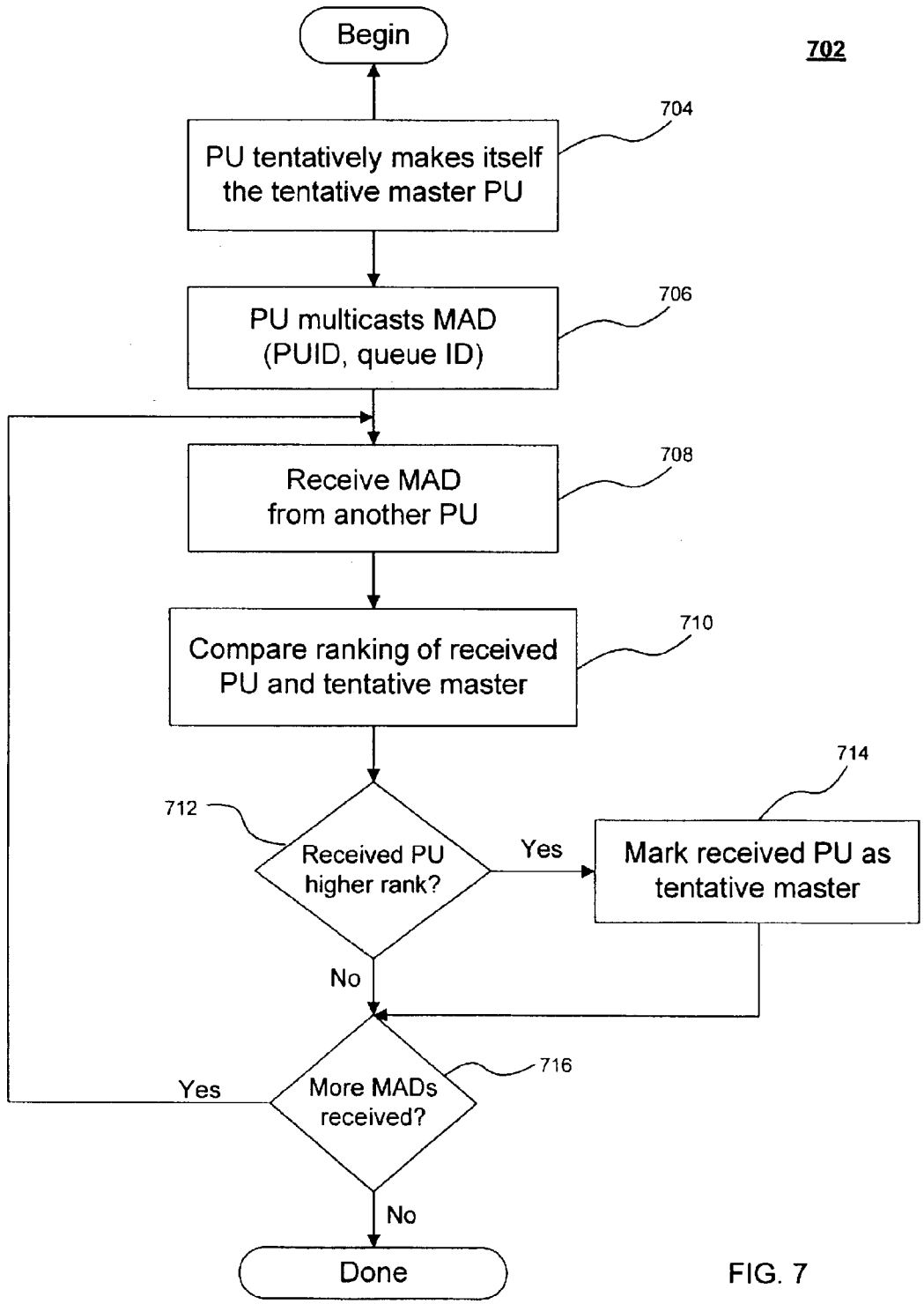
FIG. 7 is a flow chart illustrating a process for determining a master processing unit in accordance with one embodiment of the present invention.

At a block 606, in response to receiving the QC message from the management PU, the set of PUs determines a master PU. The PUs that are not the master PU become slave PUs. The designation of which PU is the master might change at various times, however, in one embodiment, exactly one master PU exists at a time for the set of PUs. The action at block 606 of determining the master PU is illustrated in FIG. 7 and discussed below.

At a block 608, the master PU multicasts a master advertisement (MAD) message including state information to each of the slave PUs. The state information is used by the PUs to coordinate the process of producing a desired virtual outgoing packet flow. Details on the state information are discussed below.

At a block 610, in response to receiving the MAD message, each slave PU synchronizes its state information with the master PU, based on the received state information and the slave PUs own state information.

At a decision block 612, a determination is made whether the master PU is disabled. This determination can be made based on one or more of a number of factors. One such factor is whether a MAD message has been received by the slave PUs within a specified amount of time. Receipt or non-receipt of other communications from the master PU can also be factors in determining whether the master PU is disabled. A communication received from another source can also be used to determine whether the master PU is enabled or disabled.

If, at the decision block 612, it is determined that the master PU is disabled, flow proceeds to the block 606, where the action of determining a master PU is performed. If, at the decision block 612, it is determined that the master PU is not disabled, flow proceeds to the block 608, where the action of multicasting state information from the master PU to the slave PUs is performed. The process 602 is performed for each virtual queue. There might be different designations of master PU for each virtual queue, or a particular PU might be a master PU for more than one virtual queue.

FIG. 7 illustrates a process 702 for determining a master PU among a set of PUs. The process 702 corresponds to the action at block 606 of FIG. 6, and is performed for each virtual queue. In one implementation, the process 702 is performed by the rate shaping module 324 of FIG. 3 corresponding to each PU. After beginning, at a block 704, each PU of the set of PUs tentatively marks itself as the master PU. At the block 706, each PU multicasts a master advertisement (MAD) message including state information to all of the PUs. The MAD message includes a processing unit ID, which is an identifier of the PU, and a virtual queue ID. The virtual queue ID (VQID) is an identifier of the virtual queue corresponding to the current performance of the process 702.

At a block 708, a PU receives a MAD message from another PU. At a block 710, the PU receiving the MAD message performs a calculation to determine whether the other (sending) PU is higher "ranked" than the tentative PU for the current virtual queue. In one embodiment, a comparison includes calculating a value of HASH (PUID, VQID) for the sending PU and for the tentative master PU, where HASH is a hash function that produces a hash value based on the input values. MD5 and SHA1 are well-known hash functions that can be used for this purpose. The PU with the higher corresponding hash value is ranked higher than a PU with a lower hash value. Using both the VQID and the PUID allows the process to determine either the same or different master PUs for each virtual queue.

At the decision block 712, a determination is made of whether the sending PU is ranked higher than the tentative PU, as known by the PU performing the current process 702. If the sending PU is ranked higher than the tentative PU, flow proceeds to the block 714, where the sending PU is marked as the tentative master. Flow then proceeds to the decision block 716, where a determination is made of whether there are any more MADs received. The decision block 716 might include waiting a specified time period to allow for a delay in receiving a MAD message. If there are additional MADS, flow proceeds to the block 708, where another MAD is processed. If there are no additional MADS, flow proceeds to the done block. When the process is done, the tentative master PU becomes the master PU. If the PU performing the process 702 is not the master PU, it becomes a slave PU.

If, at the decision block 716, a determination is made that the sending PU is not ranked higher than the receiving PU, flow proceeds to the decision block 716, where a determination of whether there are additional MADs is made, with the resultant flows as described above.

If the process 702 completes for a PU and the determination at the decision block 712 was always negative during the process, then the PU performing the process will be designated as the master PU.

It is to be noted that each PU performs the process 702, and at a point in time, PUs might differ on which PU is the tentative master. However, if each PU receives every multicast MAD message, when each PU is done with the process 702, every PU should agree on which PU is the master PU for the virtual queue corresponding to the process.

Figure 8:
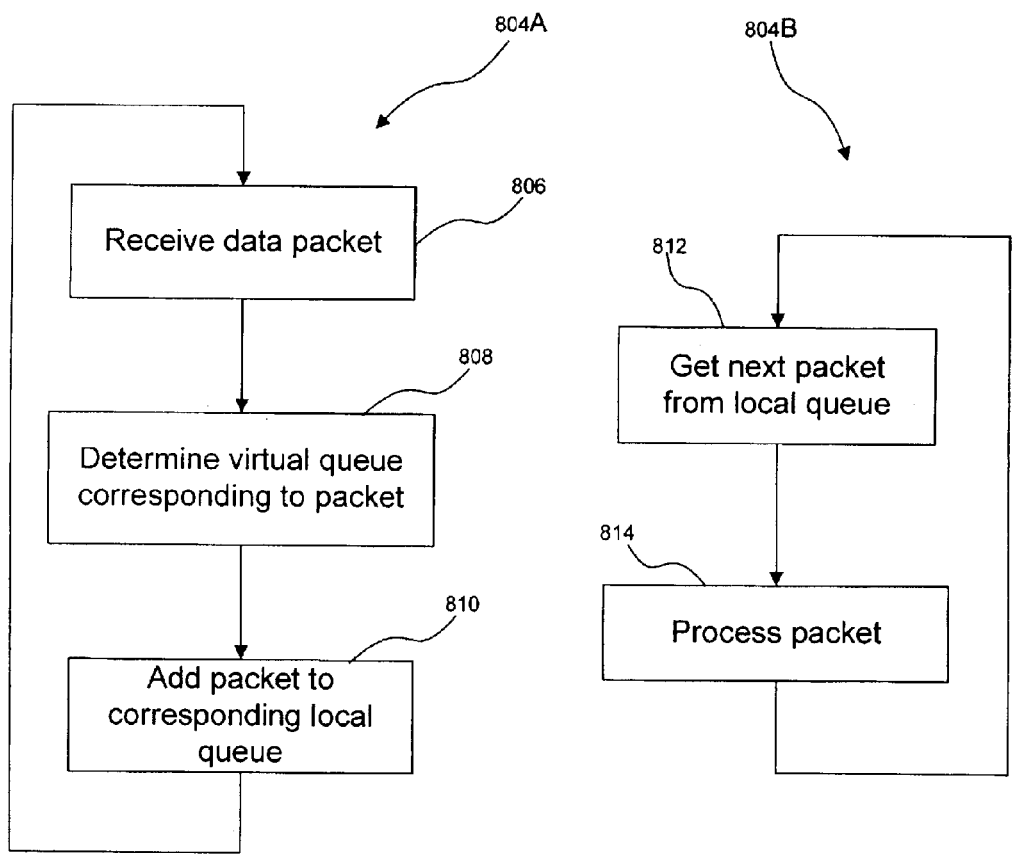
FIG. 8 is a flow chart illustrating processes for processing packets in accordance with one embodiment of the present invention.

FIG. 8 illustrates a process 802 of maintaining a member queue, in accordance with aspects of the invention. In one implementation, the process 802 is performed by the rate shaping module 324 of FIG. 3 corresponding to each PU. The process 802 includes two subprocesses. Subprocess 804A is a process of adding packets to a member queue, and subprocess 804B is a process of processing and removing packets from the member queue.

In subprocess 804A, at a block 806, a data packet is received by a processing unit (PU), such as PU 116 of FIG. 1 and PU 522A-C of FIG. 5. Receiving a data packet might include receiving the data packet from a source external to the PU. Receiving a data packet might also include receiving the data packet from a module within the PU. For example, a module within the PU might receive external packets, modify, combine, split apart, or otherwise manipulate the packets, and then pass the packets on to the module that performs the action at block 806 of receiving a data packet. The former module might also have a communication with an external device and create new packets containing some or all of the data of the communication, passing the new packets on to the module that performs the action at block 806.

At the block 808, a determination is made of which virtual packet queue 506 (FIG. 5) corresponds to the received packet. This determination might include classifying the packet according to specified classification parameters. At the block 810, the packet is added to the PU's local member queue 526A-C (FIG. 5) corresponding to the virtual queue. Flow then proceeds in a loop, repeating the actions of blocks 806-810 as necessary.

In subprocess 804B, at a block 812, the next packet in the local member queue is retrieved. As discussed above, a first-in-first-out (FIFO) algorithm can be used for adding packets and removing packets from each queue. Other queue processing algorithms can also be used.

Figure 9:
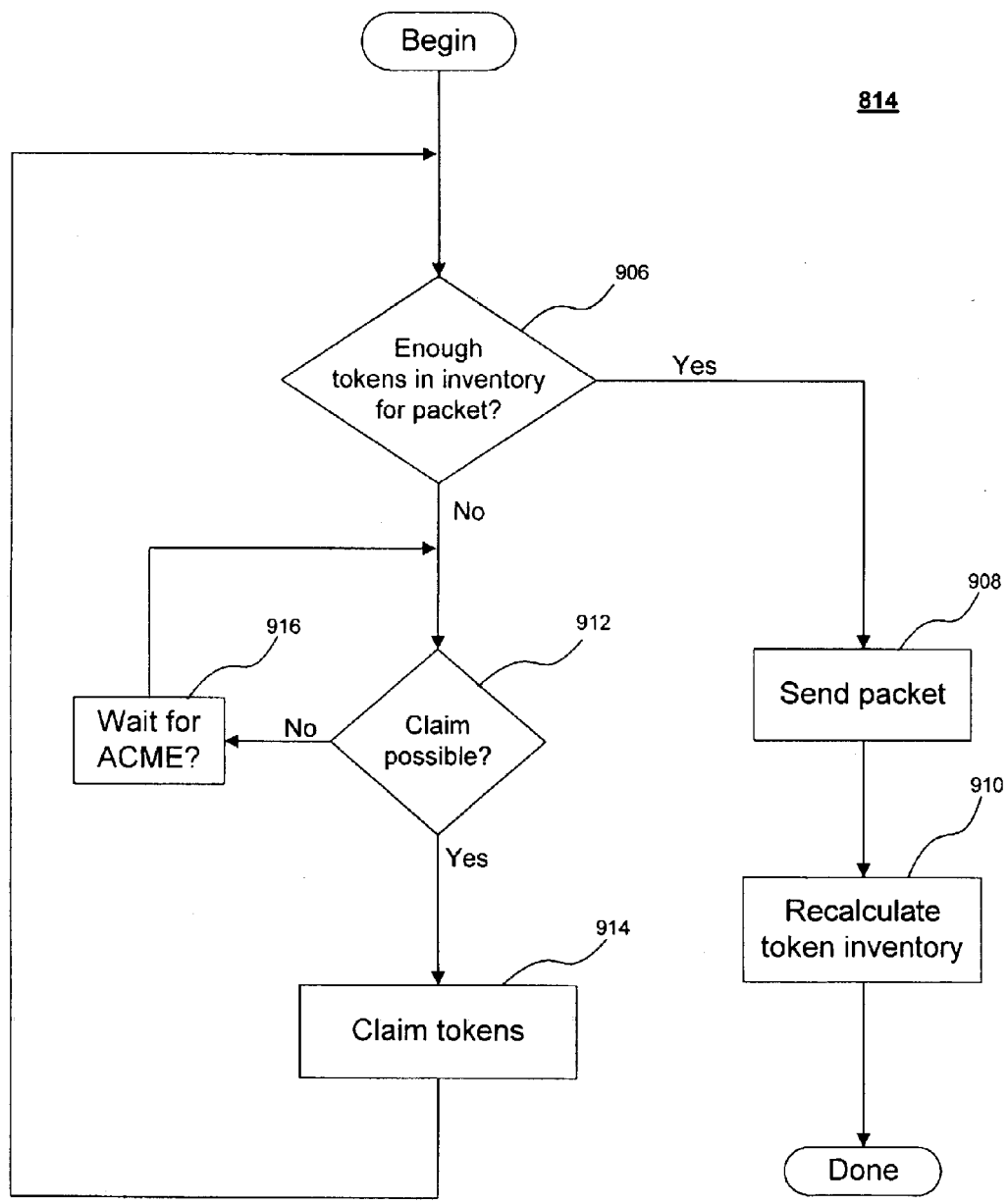
FIG. 9 is a flow chart illustrating in further detail, elements of a process for processing packets in accordance with one embodiment of the present invention.

At the block 814, the retrieved packet is processed in accordance with aspects of the invention. The processing of block 814 is illustrated in FIG. 9 and discussed below. Flow then proceeds in a loop, repeating the actions of block 812-814 as necessary.

FIG. 9 illustrates details of the block 814 of processing a packet. At a decision block 906, a determination is made of whether the PU has enough tokens in its inventory of tokens to transmit the packet. A PU maintains an "inventory" of tokens that it "borrows" from an aggregate token inventory. Each token has an associated size, in bits, which is the number of bits in data packets that it can match. In one embodiment, every token has the same fixed size. In one embodiment, the size of tokens can vary. The determination of whether the PU has enough tokens in its inventory includes determining the size, in bits, of the data packet, and comparing the packet size with the sum of the token sizes in its inventory. For example, with token sizes of 1 bit, a data packet of 256 bits would require an inventory of 256 tokens to match it. Alternatively, a token having an associated size of 256 bits would match a data packet of 256 bits.

If, at the decision block 906, it is determined that the PU has enough tokens in its inventory to transmit the current packet, flow proceeds to a block 908, where the PU sends the packet to the appropriate target recipient. For example, in FIGS. 1 and 2, the target recipient might be one of servers 126-130. For packets flowing from a server to a client, the target recipient might be client 104. At the block 910, the PU recalculates its token inventory, adjusting for the use of the token or tokens that matched the current packet.

If, at the decision block 906, it is determined that the PU does not have enough tokens in its inventory, flow proceeds to the decision block 912. At the decision block 912, a determination is made of whether a claim of at least one token is possible. The determination of whether a token claim is possible is based on data that the PU has regarding the number and timing of prior token claims, and possible expiration of the claims. Details of this determination are discussed below.

Figure 10:
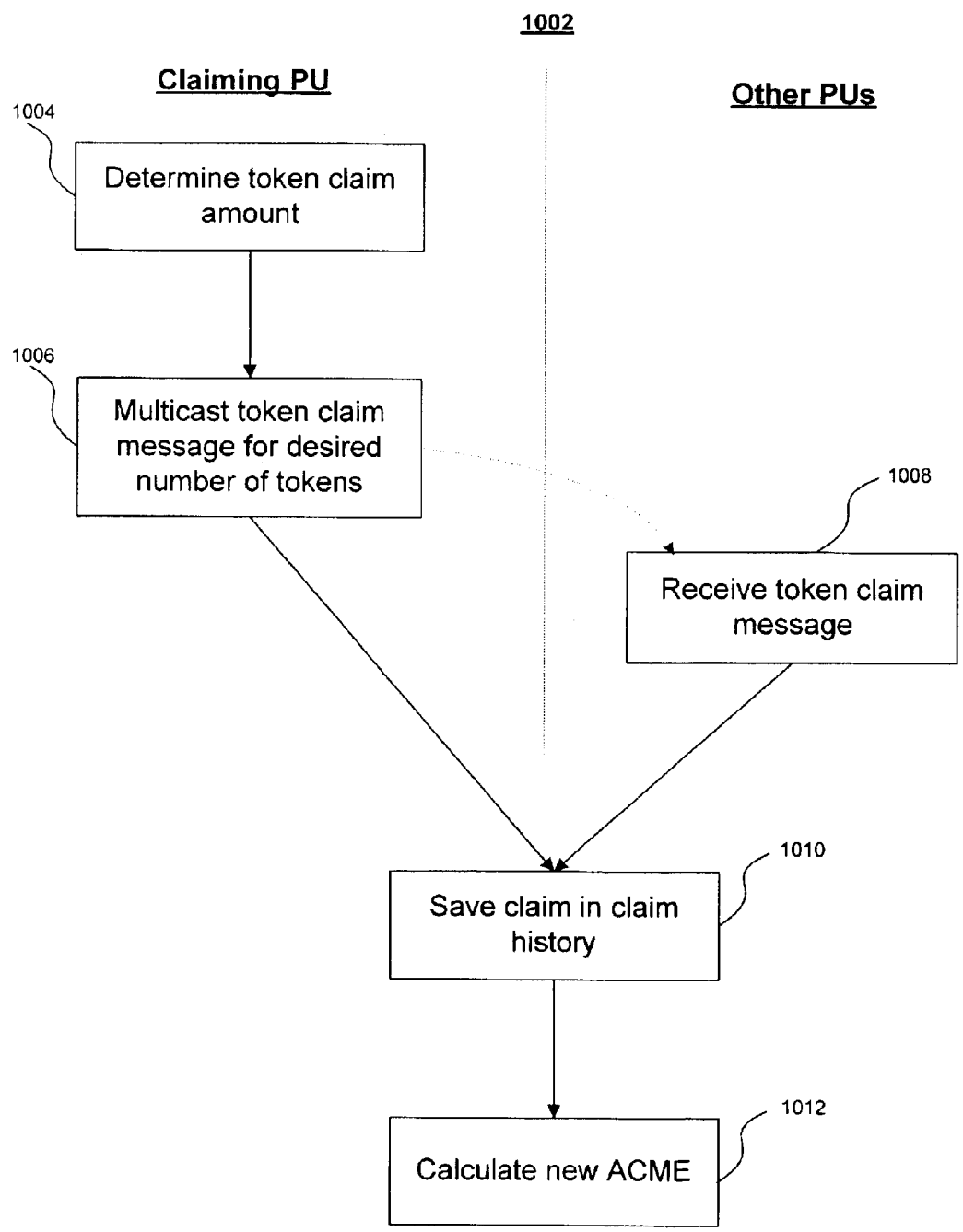
FIG. 10 is a flow chart illustrating a process for claiming tokens in accordance with one embodiment of the present invention.

If, at the decision block 912, it is determined that a token claim is possible, flow proceeds to the block 914, where a claim for one or more tokens is made. FIG. 10 illustrates, in further detail, a process for claiming tokens. Claiming additional tokens results in the token or tokens being added to the PUs token inventory. Flow then proceeds back to the decision block 906, to determine whether there are enough tokens in the PU's inventory to match the current packet. The process continues as discussed above.

If, at the decision block 912, it is determined that a token claim is not possible, flow proceeds to the block 916, where the PU waits an amount of time before looping back to the decision block 912. In one implementation, the action of waiting for an amount of time includes waiting for a signal indicating that there has been a change in state. The signal might be an external signal, such as a message received, or an internal signal, such as a timer signal or a signal from a thread indicating that the token inventory has been modified.

FIG. 10 illustrates a process 1002 of claiming a token, in accordance with aspects of the invention. The process 1002 corresponds to the action at block 914 (FIG. 9) of claiming one or more tokens. As illustrated in FIG. 10, the process 1002 includes actions by a PU making a claim, referred to as the claiming PU, and the other PUs implementing the invention. At a block 1004, the claiming PU determines an amount of the token claim that is needed to match the current data packet. If the claiming PU has an inventory of zero tokens, the amount is the amount needed to match the current data packet. If the claiming PU has a non-zero token inventory, the amount is the amount needed to make up the difference between the current data packet and the current inventory. In one embodiment, the PU claims more tokens than it needs for the current data packet, in order to add tokens to its inventory. The token claim might be enough to cover a number of expected data packets. For example, if a PU claims enough tokens for an estimated five packets, then its inventory will cover the current packet and the next four packets. This might result in less token claims, less messages sent, and higher efficiency.

In one embodiment, the claim size is determined based on the burst size (BS) and the excess burst size (EBS). A PU determines a claim size so that the maximum burst size does not exceed BS+EBS. The EBS can be selected so that the maximum burst size statistically approximates BS. A simple claim size can be calculated as:

$$CS=(EBS+BS)/N$$

At a block 1006, the claiming PU multicasts a token claim (TAC) message to the other PUs. In one implementation, a TAC message includes the following data:

The claiming PU processing unit ID (PUID)
the Virtual queue ID—a unique ID of the virtual queue.
Mean rate (MR)—a configured flow rate that is a desired mean rate of the virtual queue
Burst size
Excess burst size
Baseline commit sequence number (BCSN)—The sequence number of the last commit contained in the most recent received MAD message.
Baseline claim moratorium expiration (BCME)
Number of tokens claimed (NTC)
Time of the claim (TOC)

Some implementations include a subset of these fields. For example, mean rate, burst size, and excess burst size are configurable values. Including these fields in a TAC message provides some redundancy and therefore increases the robustness of the system.

At a block 1008, each of the other PUs receives the token claim message from the claiming PU. At a block 1010, all of the PUs—the claiming PU and the other PUs—save the claim in their respective claim histories. In one embodiment, each PU maintains a database of recent claims that have been made by any of the PUs. This history is used in calculating the expiration of tokens.

At a block 1012, each of the PUs calculates a new aggregate claim moratorium expiration (ACME). The ACME is a PUs projection of a time when all of the currently outstanding tokens will expire. The ACME is based on the size of each outstanding token, the time (TOC) of each outstanding token claim, and the configured mean rate (MR). More specifically, the ACME is proportional to the claim sizes divided by the mean rate. For a single token having a claim size of CS, where the time of the claim is TOC, the claim moratorium expiration (CME) is calculated as:

$$CME=TOC+CS/MR$$

In an exemplary simple case, where there are no existing claims, and N PUs each make a token claim CSi at the same time (TOC), the aggregate claim moratorium expiration (ACME) could be calculates as:

$$ACME = TOC + \sum_{n=1}^{N} CSn/MR$$

In the above calculation CSn/MR represents an amount of time that it takes for a token claim to expire, and the ACME calculation is based on the sum of these times.

More typically, PUs are making claims at different times. When there is a period of time with no outstanding claims, in one embodiment a calculation of aggregate expirations accounts for these periods of time. Also, the master PU periodically multicasts a MAD message that includes a baseline claim moratorium expiration (BCME). The BCME is the master PUs calculation of the ACME immediately before multicasting a MAD message. When a PU receives a MAD message, it remembers the BCME for subsequent ACME calculations.

Though the processes illustrated in FIGS. 9 and 10 have been discussed with reference to processing a single data packet, more than one packet at a time can be processed as disclosed.

Figure 11:
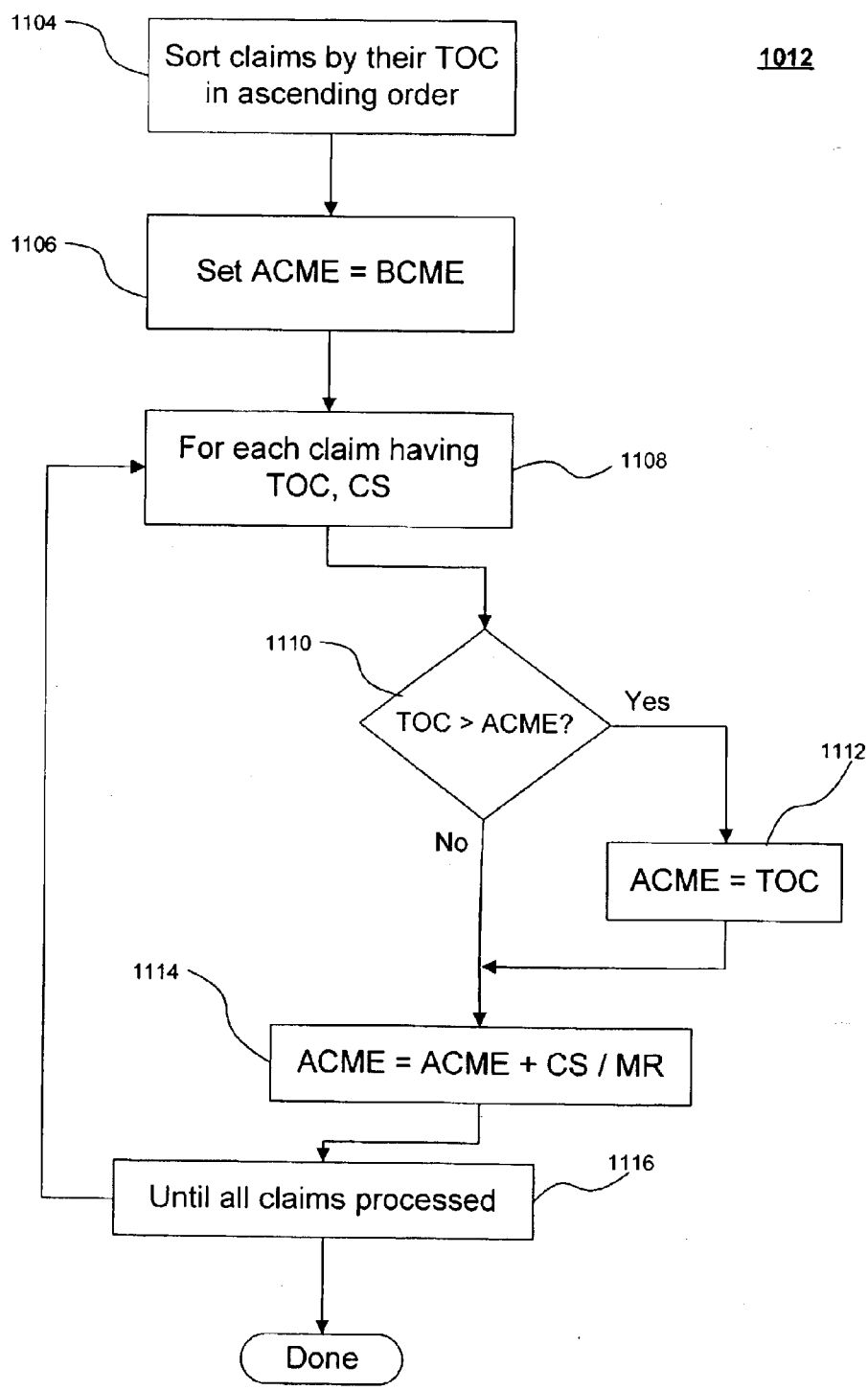
FIG. 11 is a graph illustrating an example of token allocation in accordance with one embodiment of the present invention.

FIG. 11 illustrates in further detail an embodiment of the process of block 1012 (FIG. 10), calculating an ACME by a PU. As illustrated in FIG. 11, at a block 1104, all token claims received by a PU are sorted in ascending order of their TOC. At a block 1106, the PU tentatively sets its value of ACME to be the most recent BCME received in a MAD message. Note that if the PU is the master PU, it would use the BCME most recently sent in a MAD message.

At a block 1108, the process 1012 begins a loop, with one iteration for each claim. Each claim has data fields including a time of the claim (TOC) and a claim size (CS). In the discussion that follows, the "current claim" refers to the claim for the current iteration of the loop. At a decision block 1110 within the loop, a determination is made of whether the TOC is greater than the current value of ACME. If the TOC is greater than the ACME, flow proceeds to a block 1112, where ACME is set to be the current TOC value. This is performed when there has been some amount of "unused" time, where a token claim has not been expiring, with respect to the PU's data on claims.

Flow then proceeds to a block 1114, where the value of ACME is incremented by CS/MR, where CS is the claim size of the current claim, and MR is the mean rate. The incremental value is a measurement of a length of time for the claim to expire, based on the mean rate. Flow then proceeds to a block 1116, which performs a conditional test for another iteration of the loop beginning at the block 1108. Flow then conditionally proceeds back to the block 1108 for a next iteration of the loop, if there is one.

If, at the decision block 1110, the TOC is not greater than the present value of ACME, then flow proceeds to the block 1114, where the value of ACME is incremented by CS/MR without the action of block 1112.

When the loop beginning at the block 1108 completes, the process ends the loop at the block 1116, and proceeds to the done block. The value of ACME at the end of the process 1012 is the new value of ACME for the PU performing the process.

For each PU i, the PU has a value of ACME.i, which is the value that the PU calculated. At a given point of time, the value of ACME known by each PU might differ from others. This can be due to one or more lost messages, delays in receiving or processing messages, delays in processing, differences in time when a PU calculates ACME, or for other reasons. In one embodiment of the invention, periodically, the master PU multicasts a master advertisement message, which serves to synchronize the PUs.

A MAD message contains state information pertaining to the processes described. In one implementation, a MAD message includes the following data:
  Processing unit ID (PUID) of the master PU
  the Virtual queue ID—a unique ID of the virtual queue.
  Baseline commit sequence number (BCSN)—The sequence number of the MAD message.
  Baseline claim moratorium expiration (BCME)
  Claim history—This is a list of all token claims (TAC messages) received since the previous MAD message.

When a PU receives a MAD message from a master PU, it synchronizes its database with the master PU. The PU compares the claim history received in the message with its own database of claim history. If it has any missing claims, it fills that in. It updates its BCME. It sets its ACME to be the new BCME. It can also clear some portion or all of the claim history it keeps. In one implementation, when a PU receives a MAD message, it deletes claim history older than the BCME from a prior MAD message. This can be, for example, the previous MAD message, the second previous MAD message, or one prior to that.

Figure 12:
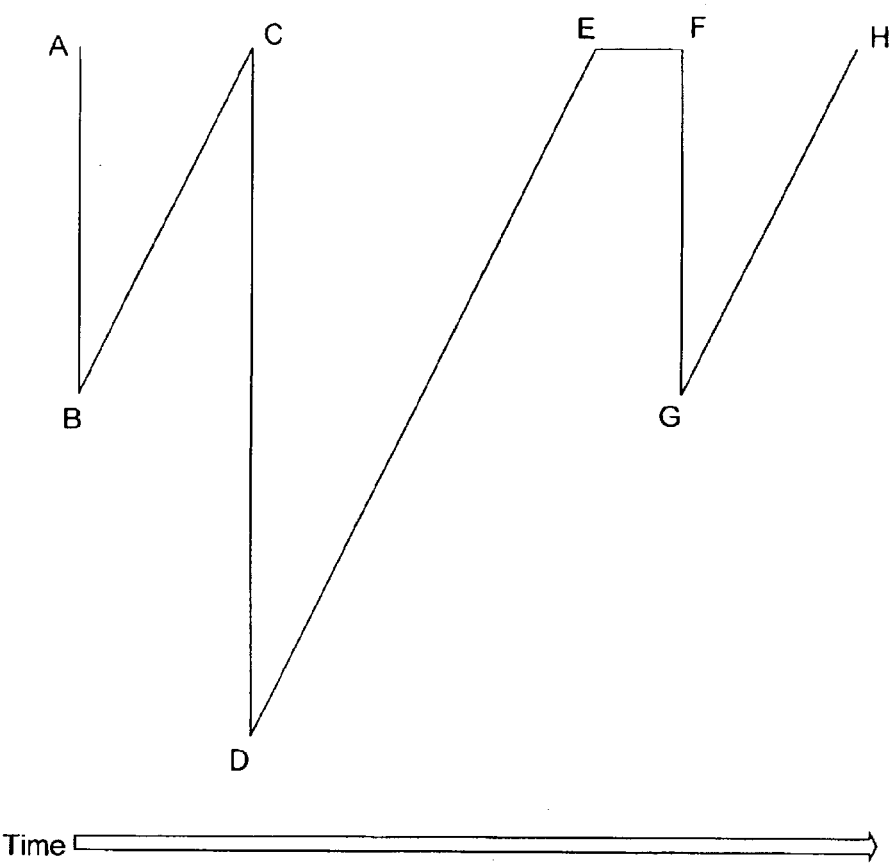
FIG. 12 is a graph illustrating another example of token allocation in accordance with one embodiment of the present invention.

FIG. 12 is a graph illustrating tokens that are known by a PU to be borrowed from the aggregate token inventory, in an exemplary sequence of events, in accordance with aspects of the invention. For illustrative purposes, only tokens claimed by the single PU are shown. A point A indicates the beginning of the graph, when there are no outstanding tokens. At this point, the PU would consider the point A to be the ACME. The line AB indicates the borrowing of a token by the PU. The line BC indicates an expiration of the borrowed token, terminating at point C. The slope of the line BC represents the mean rate of the process.

The line CD indicates the borrowing of two tokens by the PU. For illustrative purposes, FIG. 12 assumes that all tokens are the same size, though in actual implementations, this might vary. Line DE indicates the expiration of the borrowed tokens. At any time between point D and point E, if the PU computed an ACME, the result would be the time at point E. The line FG indicates a borrowing of another token. The line EF, during which there are no borrowed tokens, might indicate that there is no network traffic to process. It might also indicate a delay in processing by the PU. The line GH indicates the expiration of the tokens previously borrowed.

Figure 13:
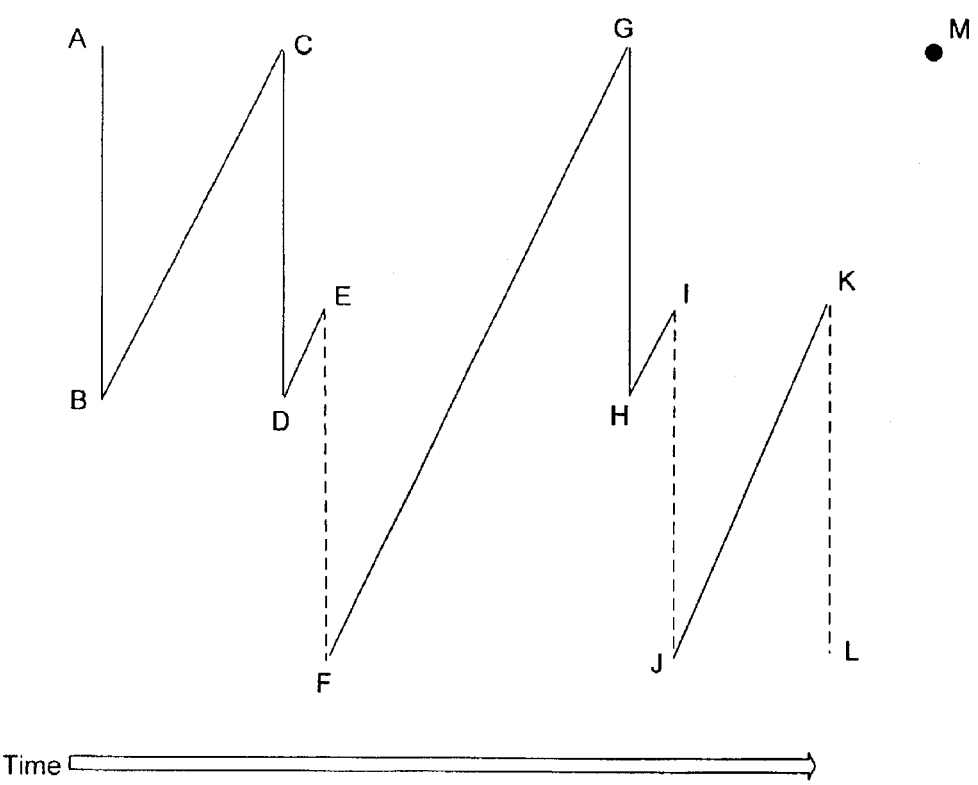
FIG. 13 is a graph illustrating another example of token allocation in accordance with one embodiment of the present invention.

FIG. 13 is another graph illustrating tokens that are known by a PU to be borrowed by the aggregate token inventory. A point A indicates the beginning of the graph, with no outstanding tokens. The line AB indicates the borrowing of a token by the PU. The line BC indicates an expiration of the borrowed token, terminating at point C.

If a data packet is received between the points B and C, in accordance with aspects of the invention, the PU waits until the ACME at point C, to claim any new tokens. At point C, the PU claims another token, represented by the line CD. The line DE represents the beginning of an expiration of the tokens. The dashed line EF represents a token claim by a second PU. In the exemplary graph of FIG. 13, the second PU might have calculated the same ACME as the first PU, and multicast a claim for a token at the same time as the first one. However, because of delays in receiving or processing messages, neither the first nor the second PU knew of the other claim until after it made its own token claim. This results in two PUs making overlapping claims and possibly transmitting data packets concurrently. This could result in a burst rate exceeding the configured mean rate for some time period between point D and point G. However, aspects of the invention cause both PUs to wait until the ACME to make a new claim. The ACME as illustrated in FIG. 13 would be at the time of point G. This time delay allows the mean rate during the time period between point D and point G to be close to the desired mean rate.

FIG. 13 further illustrates a token claim represented by the line GH, a partial expiration of the claim as represented by the line HI, and a token claim by another PU, as represented by the dashed line IJ. The line JK represents a partial expiration of the two token claims. At the point K, there is another token claim by a PU that might be the second PU or a third PU. It is to be noted that this claim occurs prior to the ACME as calculated by the first PU, represented by the point M. This token claim might happen because the claiming PU (either the second or third PU) failed to receive one of the token claim messages, and therefore calculated an ACME that did not match the illustrated ACME at point M. As discussed above, multicasting of MAD messages by the master slave works to bring slave PUs back in synchronization.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A method of employing a plurality of processors to manage the transmission of data packets across a network, comprising:
  (a) maintaining a virtual queue of data packets, maintaining the virtual queue comprising:
    (i) maintaining a plurality of member queues, wherein at least two member queues of the plurality of member queues are maintained on separate processors of the plurality of processors, such that the virtual queue comprises the plurality of member queues;
    (ii) adding data packets to each member queue;
    (iii) coordinating a rate of transmission from each member queue of the plurality of member queues by transmitting tokens from at least one processor to another processor of the plurality of processors, wherein the tokens are employed to control a rate of transmission of data packets from each member queue of the plurality of member queues; and
  (b) controlling an aggregate rate of transmission based at least in part on a specified target transmission rate, wherein the aggregate rate of transmission is based on a combination of the rates of transmission from each member queue of the plurality of member queues.

2. The method of claim 1, further comprising determining, at each processor of the plurality of processors, when to transmit data packets from the processor's corresponding member queue, based on the transmitted tokens.

3. The method of claim 1, further comprising transmitting the tokens from a master processor.

4. The method of claim 1, further comprising:
  (a) maintaining a second virtual queue of data packets, wherein the maintaining the second virtual queue comprises maintaining a second member queue on each of the processors of the plurality of processors; and
  (b) classifying each of the data packets into a packet class, wherein each virtual queue has a corresponding packet class.

5. The method of claim 4, further comprising distributing each of the data packet to one of the processors, wherein classifying each of the data packets is performed by a processor that received the data packet.

6. The method of claim 4, further comprising determining, for each virtual queue, a master processor that performs actions to synchronize each of the processors with respect to the corresponding virtual queue.

7. The method of claim 4, further comprising determining, for each virtual queue, a master processor that performs actions to synchronize each of the processors with respect to the corresponding virtual queue, such that each of the processors is approximately equally likely to be selected as the master processor for each virtual queue.

8. The method of claim 1, further comprising:
(a) at each processor, making at least a first claim representative of a quantity of data packets to be transmitted by the processor;
(b) determining an aggregate quantity of data packets to be transmitted, based on claims of the other processors;
(c) at each processor, determining when to make a second claim representative of an additional quantity of data packets to be transmitted, at least partially based on the aggregate quantity of data packets to be transmitted.

9. The method of claim 1, further comprising:
(a) at each processor, broadcasting a first claim representative of a quantity of data packets to be transmitted by the processor;
(b) at each processor, determining an aggregate quantity of data packets to be transmitted, based on claims of the other processors;
(c) at each processor, controlling the rate of transmission of the data packets from a corresponding member queue, based on the determined aggregate quantity of data packets.

10. The method of claim 1, further comprising:
(d) storing a history of claim data corresponding to each processor, the claim data corresponding to each processor including data representative of a quantity of data packets processed by the corresponding processor; and
(e) determining, at each processor, when to transmit data packets based on the history of claim data.

11. The method of claim 10, wherein each processor performs the action of storing the history of claim data, further comprising modifying, at least one processor, the corresponding history of claim data based on a message from a master processor.

12. The method of claim 10, further comprising modifying, at least one processor, the corresponding history of claim data based on a message from a master processor, the message including at least some claim data that was previously transmitted from another processor and not received from the other processor by the at least one processor.

* * * * *